United States Patent
Birch

(10) Patent No.: US 10,997,417 B2
(45) Date of Patent: May 4, 2021

(54) WEARABLE ENVIRONMENTAL MONITORING SYSTEM

(71) Applicant: Remone Birch, West Palm Beach, FL (US)

(72) Inventor: Remone Birch, West Palm Beach, FL (US)

(*) Notice: Subject to any disclaimer, the term of this patent is extended or adjusted under 35 U.S.C. 154(b) by 0 days.

(21) Appl. No.: 16/716,393

(22) Filed: Dec. 16, 2019

(65) Prior Publication Data

US 2020/0193162 A1 Jun. 18, 2020

Related U.S. Application Data

(60) Provisional application No. 62/780,303, filed on Dec. 16, 2018.

(51) Int. Cl.
| | |
|---|---|
| *G06K 9/00* | (2006.01) |
| *G01C 21/00* | (2006.01) |
| *G01S 19/13* | (2010.01) |
| *G06T 7/00* | (2017.01) |
| *G08B 21/02* | (2006.01) |
| *H04N 5/225* | (2006.01) |

(Continued)

(52) U.S. Cl.
CPC ....... *G06K 9/00671* (2013.01); *G01C 21/005* (2013.01); *G01S 19/13* (2013.01); *G06K 9/00362* (2013.01); *G06K 9/78* (2013.01); *G06T 7/248* (2017.01); *G06T 7/536* (2017.01); *G06T 7/55* (2017.01); *G06T 7/70* (2017.01); *G08B 21/02* (2013.01); *H04N 5/2253* (2013.01); *H04N 5/247* (2013.01); *H04R 1/028* (2013.01); *H04R 1/08* (2013.01); *H04R 3/00* (2013.01); *G06K 2209/23* (2013.01); *G08B 7/06* (2013.01)

(58) Field of Classification Search
CPC .. G06K 9/00671; G06K 9/78; G06K 2209/23; G06K 9/00362; G06T 7/248; G06T 7/536; G06T 7/55; G06T 7/70; H04R 1/028; H04R 1/08; H04R 3/00; G01S 19/13; G01C 21/005; G08B 7/06; G08B 21/02; H04N 7/185; H04N 7/18; H04N 5/2253; H04N 5/247
USPC ........................................................ 348/140
See application file for complete search history.

(56) References Cited

U.S. PATENT DOCUMENTS

| | | | | |
|---|---|---|---|---|
| 9,697,721 | B1* | 7/2017 | Akuoku | G08B 21/0297 |
| 10,257,434 | B2* | 4/2019 | Arnold | A42B 3/22 |

(Continued)

*Primary Examiner* — Susan E. Hodges
(74) *Attorney, Agent, or Firm* — Allen F. Bennett; Bennett Intellectual Property

(57) ABSTRACT

A wearable environmental monitoring device monitors a traveler's environment for objects stored in a database. The device includes a camera and a microcontroller. The microcontroller scans images recorded by the camera in real time and compares it to images stored in a database of objects or dangerous objects. A dangerous object may also be scanned for using a remote computer having a more extensive database of dangerous objects, such as sex offenders and violent criminals. Dangerous objects may also include animals such as panthers or other dangerous object. The camera may be facing toward the reader of the wearer to monitor persons and objects outside the wearer's field of view. The device also measures the distance, direction and velocity of the traveler and generates a return trip guide allowing a traveler to retrace his or her path to avoid becoming lost.

5 Claims, 6 Drawing Sheets

(51) Int. Cl.
    *H04N 5/247*     (2006.01)
    *G06T 7/246*     (2017.01)
    *G06T 7/536*     (2017.01)
    *G06T 7/55*     (2017.01)
    *G06T 7/70*     (2017.01)
    *H04R 1/02*     (2006.01)
    *H04R 1/08*     (2006.01)
    *H04R 3/00*     (2006.01)
    *G06K 9/78*     (2006.01)
    *G08B 7/06*     (2006.01)

(56) References Cited

U.S. PATENT DOCUMENTS

| | | | |
|---|---|---|---|
| 2009/0102859 A1* | 4/2009 | Athsani | G06F 3/011 |
| | | | 345/619 |
| 2014/0294257 A1* | 10/2014 | Tussy | H04W 12/02 |
| | | | 382/118 |
| 2015/0085133 A1* | 3/2015 | Teich | H04N 5/332 |
| | | | 348/159 |
| 2016/0026853 A1* | 1/2016 | Wexler | H04N 5/23229 |
| | | | 382/103 |
| 2016/0093207 A1* | 3/2016 | Di Censo | H04R 1/1091 |
| | | | 340/944 |
| 2016/0210834 A1* | 7/2016 | Dayal | A61H 3/061 |
| 2017/0278377 A1* | 9/2017 | Fritch | G08B 21/22 |
| 2018/0059660 A1* | 3/2018 | Heatzig | G06K 9/00664 |

\* cited by examiner

WEARABLE ENVIRONMENTAL MONITORING SYSTEM

BACKGROUND OF THE INVENTION

Field of the Invention

The present invention relates to a device for monitoring a person's immediate environment and alerting the wearer to the presence of a person or object. More particularly, the invention relates to a portable, wearable environmental monitoring system having a camera that captures images around a person and identifies objects in the captured image. The system alerts the wearer when an image from the camera matches one of the objects in the database.

Description of the Related Art

Many people assaulted in public places are first followed by their attacker. Thus even in safe neighborhoods persons always want to know if they are being followed. Furthermore, if a person is walking behind someone it is not always easy to tell whether that person is a threat or simply happens to be walking in the same direction. Many people carry mace or another defensive weapon in a purse or pocket. However, if caught unaware they may be unable to use their defensive devices. Similarly, if a person is walking somewhere they expect to be alone, he or she would get startled if someone random pops up. That random person may not be a bad or dangerous person but it is good to be aware of them and to know your surroundings.

In the information age, law enforcement has begun to keep detailed records of violent criminals and sexual predators. Everyone would want to know if a person walking behind him or her was known to be a dangerous, or dangerous, person. However, no person could ever memorize all of the people stored in one of these databases.

Furthermore, existing portable electronic devices, i.e. smart phones, smart watches, tablets, and other wearable electronic devices, often include pedometer functions, but they are wildly inaccurate to the point of being almost useless. Pedometers that include a GPS module are more accurate, but of no avail of GPS service is unavailable.

Other portable devices may map a route taken by a person. However, if internet, cellular phone, or GPS access is unavailable, then a map cannot be made from the traveler's path. This is especially problematic when a traveler is moving through unfamiliar and/or remote territory and concerned about becoming lost. Generating an accurate back tracking return trip guide that allows the traveler to retrace his or her steps is an age old problem. Leaving a trail of bread crumbs is well known to be ineffective. Portable electronic devices are ineffective if they are outside a service area, as explained above.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide an environmental monitoring system that identifies dangerous persons or objects within the vicinity of a person. It is also desirable to provide a more accurate pedometer and a reliable back-tracking return trip guide which are entirely self-contained and not dependent on connection to the internet, cellular phone services, GPS systems and/or other networks.

BRIEF SUMMARY OF THE INVENTION

Disclosed is a wearable environmental monitoring system. It includes a wearable article having at least one camera capturing images, a database of dangerous objects, and a microcontroller running image recognition software in real-time. The microcontroller generates an alert signal when the microcontroller identifies a dangerous object from the database in the images captured by the camera.

In one embodiment, A wearable environmental monitoring device comprising a camera capturing still images at preselected time intervals, a wireless transmitter, a storage medium containing a database of objects and a microcontroller running image recognition software in real-time. The microcontroller generates a data packet when the image recognition software identifies one or more objects from the database in one of the images captured by the camera, the data packet including the image containing the one or more objects from the database and the time at which the image was captured. The wearable environmental monitoring device may transmit the data packet to a remote computer. The wearable environmental monitoring device may further comprise a microphone, wherein microcontroller activates the microphone and records an audio signal when the microcontroller identifies one or more objects from the database in one of the images captured by the camera, and may include the audio signal in the data packet. The wearable environmental monitoring device may also include a GPS module, and include the location where the image was captured in the data packet.

In another embodiment, a method of monitoring the environment of a traveler comprises providing a wearable environmental monitoring device comprising a camera, a wireless transmitter, a storage medium containing a database of objects, and a microcontroller. The device is attached to a traveler, and the camera captures still images at preselected time intervals. The microcontroller runs image recognition software in real-time and determines whether the one or more of the captured still images includes one or more objects in the database of objects. When the microcontroller identifies one or more objects from the database in one of the images captured by the camera, it generates a data packet including the image containing the one or more objects from the database and the time at which the image was captured. The traveler is alerted when the microcontroller determines that the captured image includes one or more objects from the database of objects. The method of monitoring the environment of a traveler may also include a remote computer having a remote database of dangerous objects. The microcontroller transmits the data packet to the remote computer, which then determines whether the captured image in the data packet includes one or more dangerous objects from the database of dangerous objects. If a dangerous object is detected, the traveler is alerted.

The method of monitoring the environment of a traveler may also include a microphone as a part of the wearable environmental monitoring device. The microcontroller activates the microphone and recording an audio signal when the one or more objects from the database is identified in one of the images captured by the camera. The audio signal recorded by the microphone is then included in the data packet. The database of objects in the storage medium can include a human shape, an animal shape, and an automobile shape. The remote database of dangerous objects can include images of persons within the traveler's vicinity who have been convicted of a violent crime.

The method of monitoring the environment of a traveler can include transmitting the data packet to a remote network directly, or through a portable electronic device connected to both the microcontroller and the remote network. The environmental monitoring device can include a second camera facing a direction opposite to a direction of the first camera. Generally, the first camera faces rearward relative to the traveler and the second camera faces forward. The second camera also captures still images. The microcontroller can be provided with the height at which the traveler positions the cameras from the ground. This allows the microcontroller to calculate the speed and direction of the traveler by comparing changes in size and position of objects in subsequent images recorded by the second camera and also to subsequently calculate the total distance traversed by the traveler. The relative distance and speed of an object identified as one or more of the preselected objects in the images recorded by the first or second cameras can also be determined.

A portion of the images recorded by the first camera may be organized in reverse chronological order to provide a return trip guide. The traveler can request the microcontroller to guide the traveler along a return trip. The microcontroller then compares images recorded by the second camera received in real-time to the images of the created return trip guide by identifying a shift in a position of at least one object in the real-time images compared to the image in the return trip guide and providing a signal to a traveler indicating a change in direction necessary for the image in the return trip guide to match the position of the image recorded by the second camera in real time. The device provides a signal to the traveler indicating a change in direction necessary for the image in the return trip guide to match the position of the image recorded by the second camera in real time comprises a directional arrow displayed on a cellular phone by a software application wirelessly linked to the microcontroller.

In another embodiment, a method of monitoring the environment of a traveler comprises providing a wearable environmental monitoring device comprising a first camera, a wireless transmitter, a storage medium containing a database of objects, and a microcontroller. The environmental monitoring device is attached to a traveler. The first camera captures still images at preselected time intervals. The microcontroller runs image recognition software in real-time and determines whether the captured still images include one or more objects in the database of objects. A data packet is generated when the image recognition software identifies one or more objects from the database in one of the images captured by the camera. The data packet includes the image containing the one or more objects from the database and the time at which the image was captured. The traveler is alerted when the microcontroller determines that the captured image includes one or more objects in database of objects. A remote computer has a remote database of dangerous objects. The microcontroller transmits the data packet to the remote computer, which then determines whether the captured image in the data packet includes one or more dangerous objects and alerts the traveler when the remote computer determines that the captured image includes one or more dangerous objects in database of dangerous objects. The microcontroller is also provided with the height of the camera from the ground and is thus able to calculate the speed and direction of the traveler by comparing changes in size and position of objects in subsequent images recorded by the second camera. This includes calculating the distance and relative speed of an object identified as one or more of the preselected objects in the images recorded by the first or second cameras. A portion of the images recorded by the first camera are stored in reverse chronological order to provide a return trip guide. The traveler can request the microcontroller to guide the traveler along a return trip. The microcontroller then compares images recorded by the second camera received in real-time to the images of the return trip guide by identifying a shift in a position of at least one object in the real-time images compared to the image in the return trip guide. The microcontroller then provides a signal to the traveler indicating a change in direction necessary for the image in the return trip guide to match the position of the image recorded by the second camera in real time.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
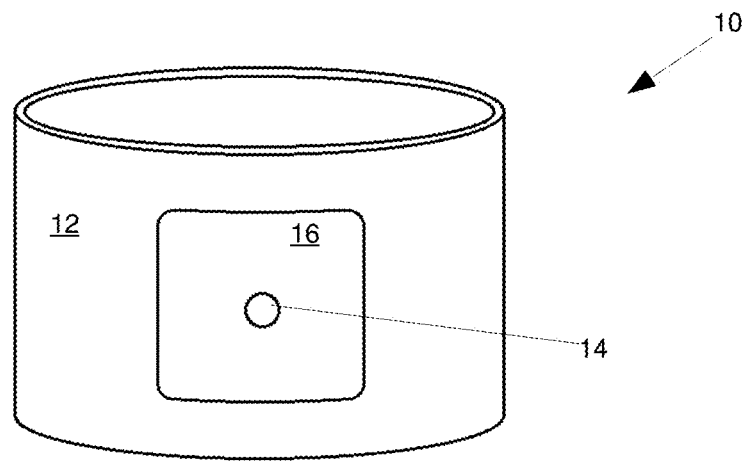
FIG. 1 is a perspective view of a wearable environmental safety monitoring system in accordance with principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Disclosed is a wearable device that monitors the wearer's environment, detects the presence of persons, animals or other objects, measures distance and direction traveled, records a return trip, provides alerts and records important information. The device may be used by a traveler wearing the device, i.e. the wearer, while walking, running, jogging, swimming, floating on a kayak or canoe, riding in a boat, riding a bicycle, riding a motorcycle or otherwise traveling.

Figure 2:
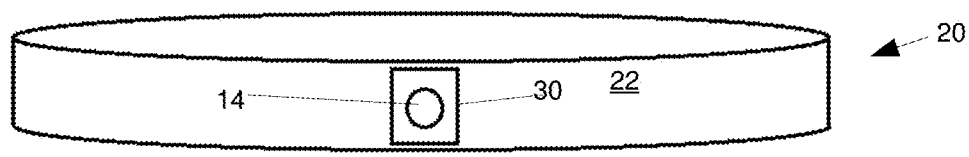
FIG. 2 is a perspective view of another embodiment of a wearable environmental safety monitoring system in accordance with the principles of the invention.

FIG. 1 shows a typical wearable environmental monitoring device 10 for a wearable environmental monitoring system in accordance with the principles of the invention. The wearable and mobile monitoring system 10 includes an elastic armband 12 and a camera 14 mounted on a microcontroller 16 housing a microprocessor and other modules. The armband 12 may be placed over a wearer's upper arm so that the camera 14 is facing rearward. FIG. 2 shows another typical wearable environmental monitoring device 20 in accordance with principles of the invention. The device 20 includes a headband 22 with a camera 14 mounted on a microcontroller 30 housing a microprocessor and other modules.

Figure 3:
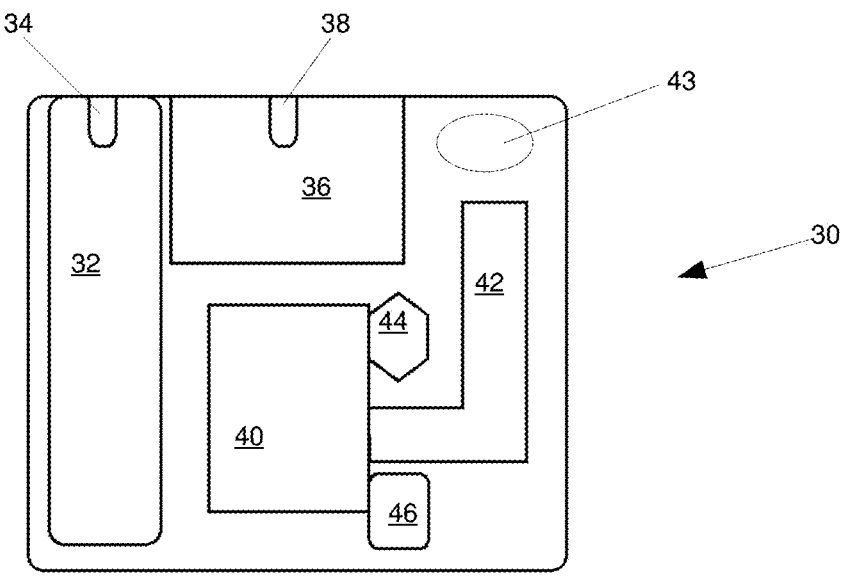
FIG. 3 is a microcontroller for a wearable environmental safety monitoring system in accordance with the principles of the invention.

FIG. 3 shows a typical module 30 for use with either of the systems 10 and/or 20 shown in FIG. 1 and FIG. 2 in accordance with principles of the invention. Microcontroller 30 includes a rechargeable battery 32 having an access port 34, a memory storage module 36 having an access port 38, a microprocessor 40, a transmitter 42, a microphone 43, an accelerometer 44, and a GPS module 46. In use, the microprocessor 40 receives images from a camera. It compares these images with a library of images of objects, i.e. a database of objects, stored in the memory storage module 36. The microcontroller 30 wirelessly communicates with an electronic device such as a cell phone or tablet using technology such as Bluetooth® or the like. Optionally, the microcontroller 30 communicates wirelessly to a local Wi-Fi network or other computer system or network. Any wireless or wired communication system that allows the microcontroller 30 to transmit images, video, audio and other information may be suitable for use with the invention. The microcontroller 30 may also optionally connect directly to a cell phone network or satellite phone system.

Figure 4:
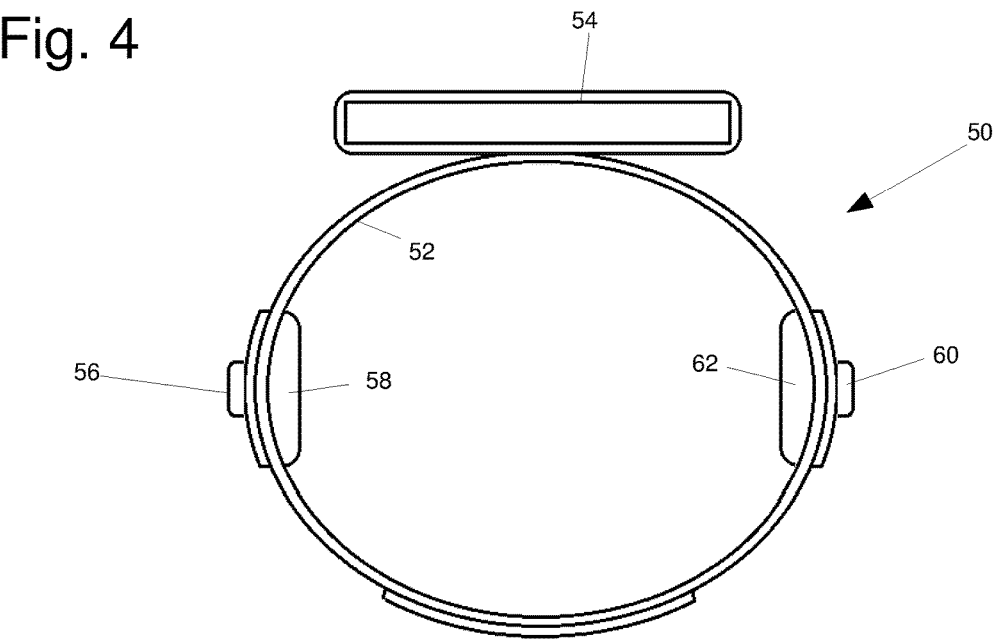
FIG. 4 is a perspective view of another embodiment of a wearable environmental safety monitoring system in accordance with principles of the invention.

FIG. 4 shows another embodiment of a wearable environmental monitoring device 50 comprising an armband 52, a cell phone holster 54, a first camera 56 mounted on a first microcontroller 58, and a second camera 60 mounted on a second microcontroller 62 in accordance with the principles of the invention. The armband 52 of the wearable monitoring device 50 is similar to the commonly used cell phone armband holsters use by persons while exercising and often employed to play music during exercise, but further includes a first camera 56 facing rearward and a second camera 60 facing forward, relative to the user, i.e. the traveler. When an object is detected, it sends a signal to a cell phone 64 in the cell phone holster 54 which then relays an alert signal through the wearer's earphones. The alert signal may include the identity of the object or other information. The microcontrollers 58 or 62 they also record the time and location of the encounter, and may store this information along with video and/or transmitted via a Wi-Fi network to a remote computer station. In the events the encounter results in injury, a video record will be preserved.

Figure 5:
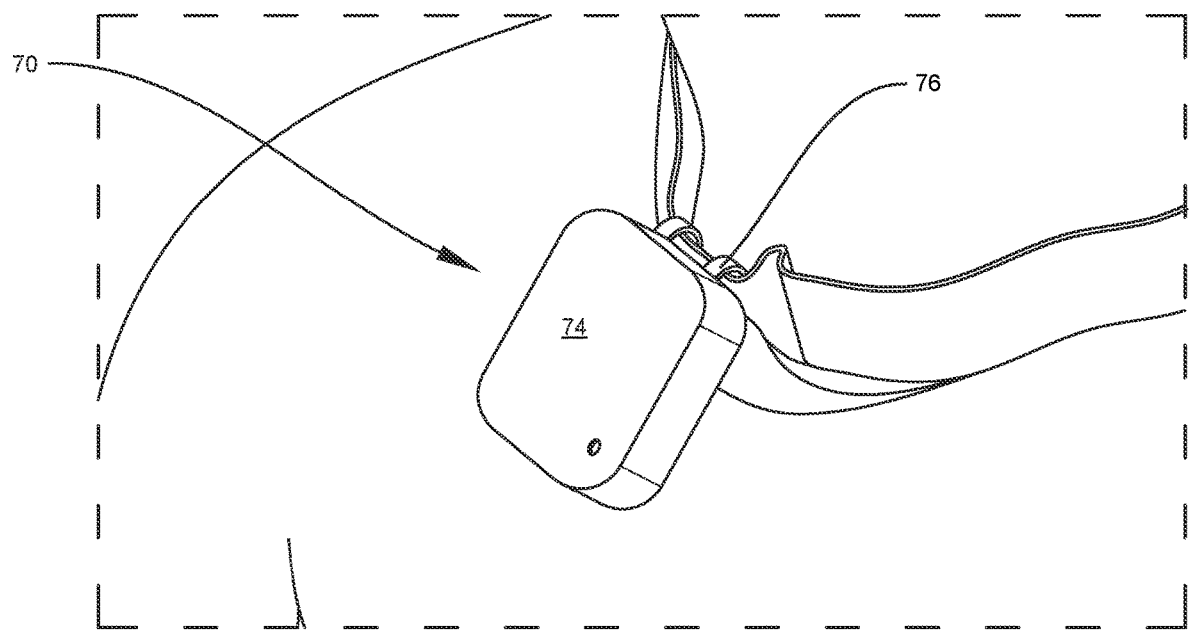
FIG. 5 is an environmental perspective view of a person wearing an environmental safety monitoring system in accordance with principles of the invention.

FIG. 5 shows another alternative wearable environmental monitoring system 70 in accordance with principles of the invention. In this embodiment, a camera 72 is mounted with and a rigid plastic case 74 which houses a microprocessor and other modules such as those shown in FIG. 3. A clip 76 allows a wearer to place the device on an article of clothing.

Safety Monitor Function.

The present invention provides several safety features to the wearer of an environmental monitoring device. The safety monitor system monitors the environment for dangerous or potentially dangerous objects or persons such as cars, registered sex offenders, and animals such as bears or panthers. The system's camera records images of the wearer's surroundings, and identifies moving objects such as objects following the wearer. The microcontroller scans images recorded by the camera in real time and compares it to images stored in a database of objects. Typically, an object will include persons in databases for sexual offenders and other violent criminals. Dangerous objects may also include animals such as panthers or other dangerous objects. The camera may be facing toward the reader of the wearer to monitor persons and objects outside the wearer's field of view. The camera may be facing any direction, and the invention may utilize more than one camera facing in different directions.

Figure 6:
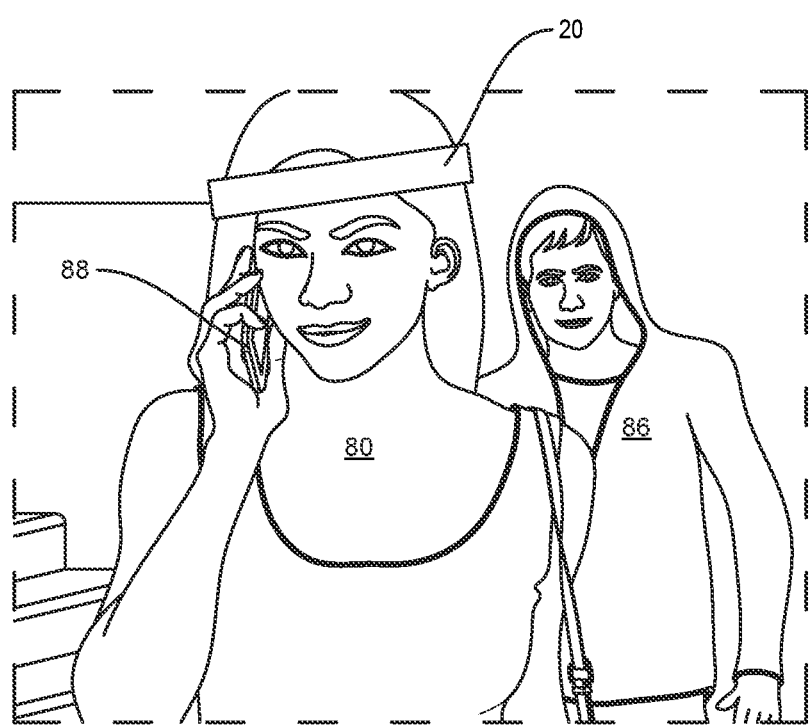
FIG. 6 is an environmental perspective view of a person wearing an environmental safety monitoring system in accordance with principles of the invention.

FIG. 6 shows a person 80 wearing the environmental monitoring system 20 shown in FIG. 2. The person 80 may be exercising or simply distracted by a phone call. The camera of the monitoring system 20 records the images of objects behind the person 80 and compares them to the images in its database of objects. In this embodiment, the database of objects includes images of persons known to have committed dangerous assaults, such as e.g. sexual predators. In FIG. 6, a sexual predator 86 is following the person 80 who is unaware of the predator's presence. Upon matching the predator 86 with an image in its library, the monitoring system 20 sends an alert to the person's 80 cell phone 88, alerting her to the danger. This provides the person 80 an opportunity to react to the identified danger without immediately alerting the identified danger to her knowledge of the threat. The person 80 may elect to call police, run, or retrieve mace or other defensive devices from her purse. The microcontroller will also record the image as well as the day and time and location of the encounter. The monitoring system 20 may also optionally activate the microphone to begin recording video and/or audio in order to capture a more detailed record of the dangerous situation. Optionally, the microcontroller 20 may include other means of conveying an alert signal, such as a haptic feedback module or a speaker for emitting an audio alert. The device may provide different alert signals for different categories of objects.

Optionally, the monitor's database of objects may be relatively simple and include outlines of human shapes and faces, as well as images of animals and automobiles. When an object is detected, the monitoring device may send a data packet to a remote computer for further analysis. The data packet may include only the image captured by the camera and containing the object and a time at which the object was detected. Optionally, the data packet may include audio or video recording of the object. The remote computer compares the object in the image sent with the data packet with a database of dangerous objects using image recognition software. The database of dangerous objects is more expansive than the monitors database of objects, and includes faces and/or other images of persons known to be dangerous such as sexual predators or other violent criminals. If the remote computer detects a dangerous object, it will alert the traveler wearing the monitoring device. The alert may be a text message, a phone call, a haptic signal generated by a portable electronic device (e.g. a cellular phone, a smartphone, a tablet, a smart watch, or other wearable electronic device such as for example a Fitbit®). The alert may also optionally be an audio or other signal generated by the monitoring device itself. Optionally, the remote computer may also activate a video or other camera in the traveler's vicinity to begin recording the location of the traveler. For example, malls and stadiums often have several security cameras that could be activated by the remote computer. Satellite also have cameras that may be activated. The wearable monitoring devices in accordance with the invention can also be used by military personnel in the field, and a remote computer can actuate a drone or satellite to monitor a soldier's location.

Figure 7:
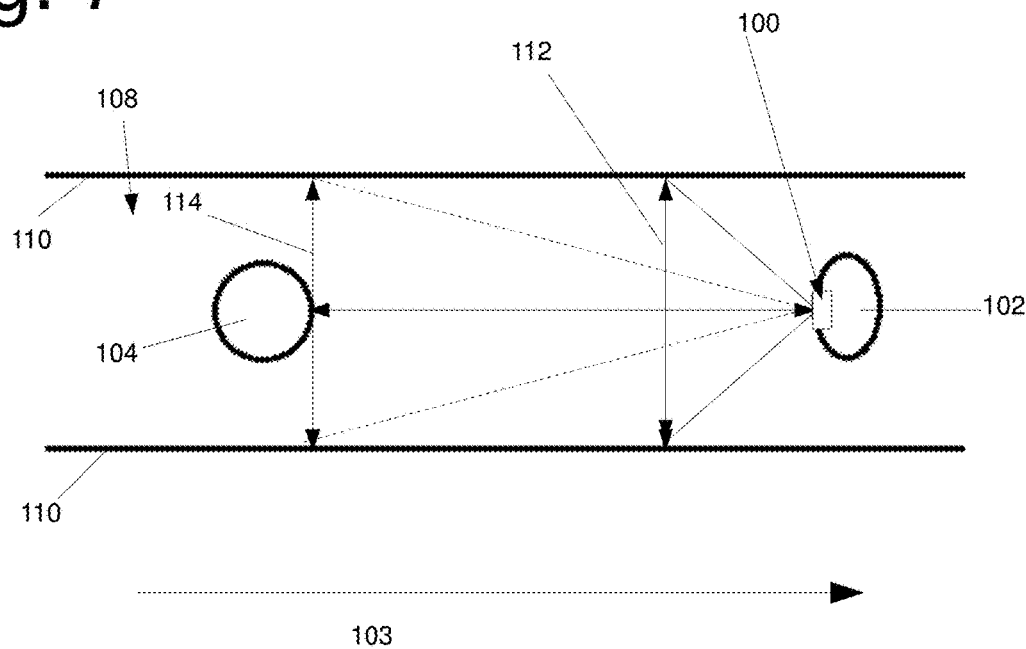
FIG. 7 is a diagrammatic view of a method of measuring the velocity and position of an object relative to a traveler in accordance with principles of the invention.

The monitor of the present invention may determine additional information regarding a wearer's environment. FIG. 7 shows a monitor 100 being used by a traveler 102 moving in direction 103 and having a camera facing rearward. The traveler 102 may be walking, running or riding a bicycle. The traveler 102 has provided the monitor 100 with the height above the ground at which the monitor 100 is being worn. The monitor 100 also has stored a list of objects to search camera images for, such as large dogs or persons. In this example, the monitor 100 has detected a person 104 behind the traveler 102.

In this embodiment, the traveler 102 is traveling down a path 108. The monitor 100 can measure the distance from the traveler 102 to each side 110 of the path 108 within the camera's field of vision while also measuring the angle between the two sides 110 of the path 108. From this information, the monitor 100 can calculate the width 112 of the path. The monitor 100 can then determine the distance from the traveler 102 to the person 104 by measuring the difference between the actual with 112 of the path and the width of the path 114 at the person's 104 feet in the camera's image. Those skilled in the art will appreciate that the apparent width of the path will change in an image from the camera by growing smaller as distance increases. Thus there are at least two methods by which the monitor 100 may determine the distance between the traveler 102 and the person 104. The same calculations may be performed when the object detected is a dog or an automobile or any other object observed by the camera.

Figure 8:
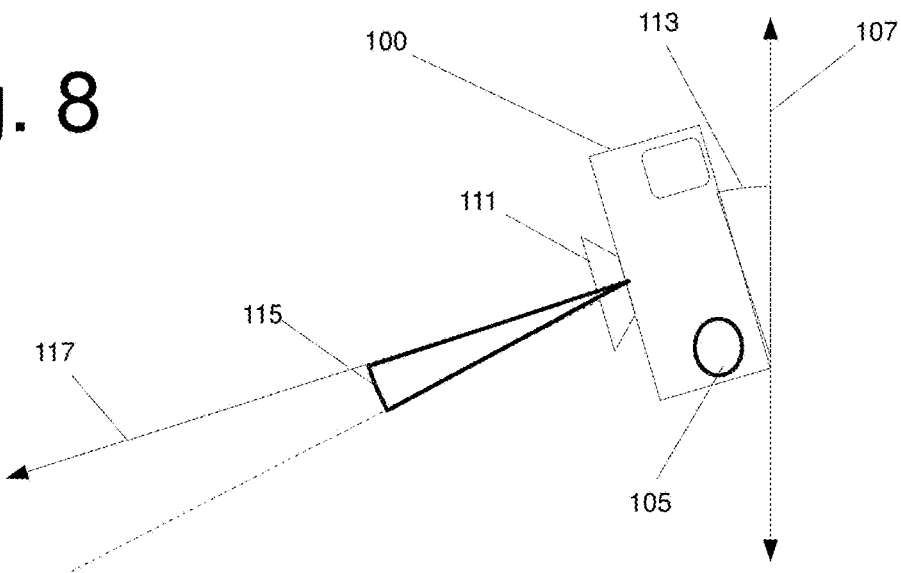
FIG. 8 is a camera of a wearable environmental monitoring device in accordance with principles of the invention.

FIG. 8 shows how the monitor 100 may compensate for the camera being worn in a manner such that its line of sight is not perfectly horizontal. The monitor 100 has an internal accelerometer 105 which may be used to determine the vertical axis 107. The microcontroller of the monitor 100 may then measure the angle 113 between the vertical axis 107 in the vertical axis 109 of the camera 111. The microcontroller may then add this angle 113 to the downward angle 115 measured from the centerline 117 of the camera to determine the correct angle from which to calculate distance to an object using the height of the monitor and the angle between the camera and the object being measured. Using the measured vertical axis 107, the total downward angle and the monitor's height above the ground and the downward angle to the person's 104 feet, the device is able to calculate an approximate distance between the traveler 102 in the person 104 using simple trigonometry. Optionally, the monitor 100 may also make a rough estimate of the distance between the traveler 102 and the person 104 by assuming the person 104 is of average build and estimating the distance to the person 104 based on the overall size of the image recorded by the camera. In addition, the monitor 100 can determine the speed and direction of the person 104 relative to the traveler 102 by measuring the change in the size of the image over time. If the image increases over time the person 104 is coming closer to the traveler 102 and the image decreases over time then the person 104 is moving farther away from the traveler 102.

Generally, the camera will be a camera for detecting visible wavelengths. Optionally, the camera may be an infrared camera detecting a heat signature rather than a visible image. The same calculations may be performed to determine the distance of an infrared image and the rates at which it approaches or moves away from the traveler 102. When an object is detected, the monitor 100 may also activate the microphone to record any exchanges or interactions with the person 104 or other objects in the vicinity of the traveler 102.

Optionally, the monitor may send a signal to the traveler's cell phone providing an alert to the traveler 104 of the object. For example, a software application on the cell phone may provide an image of the object detected or may show a diagram similar to that of FIG. 6 indicating the distance and speed of the object. This data may also be sent to a remote computer network to record the encounter. The data sent to the remote network may include the location of the traveler, the distance and speed of the object, audio recording during the encounter, and/or images of the object recorded by the camera. This data may be sent directly from the monitor to a remote network or may be sent to the network through the traveler's cell phone. This provides a detailed recording of the incident. The camera generally records still frame snapshots over regular intervals. For example, the camera may take a picture every two seconds. The time interval between snapshots may be programmed by the traveler directly with the monitor or by using a software application on his or herself. Optionally, the monitor may also be programmed using a computer connected via a USB or other port. Optionally, the traveler may program the camera to take video recordings if an object is detected.

Data sent to a remote computer network may be saved for a predetermined amount of time, for example one week, so that the information may be used if necessary. For example, if a person is attacked or assaulted images, audio recordings, video recordings, date, time, and location of the attack can be invaluable evidence of what took place and who or what was responsible. Optionally, the microcontroller can be programmed to disregard images of particular objects, such as friends or pets, provided to the microcontroller and identified as objects to be ignored.

Pedometer.

Figure 9:
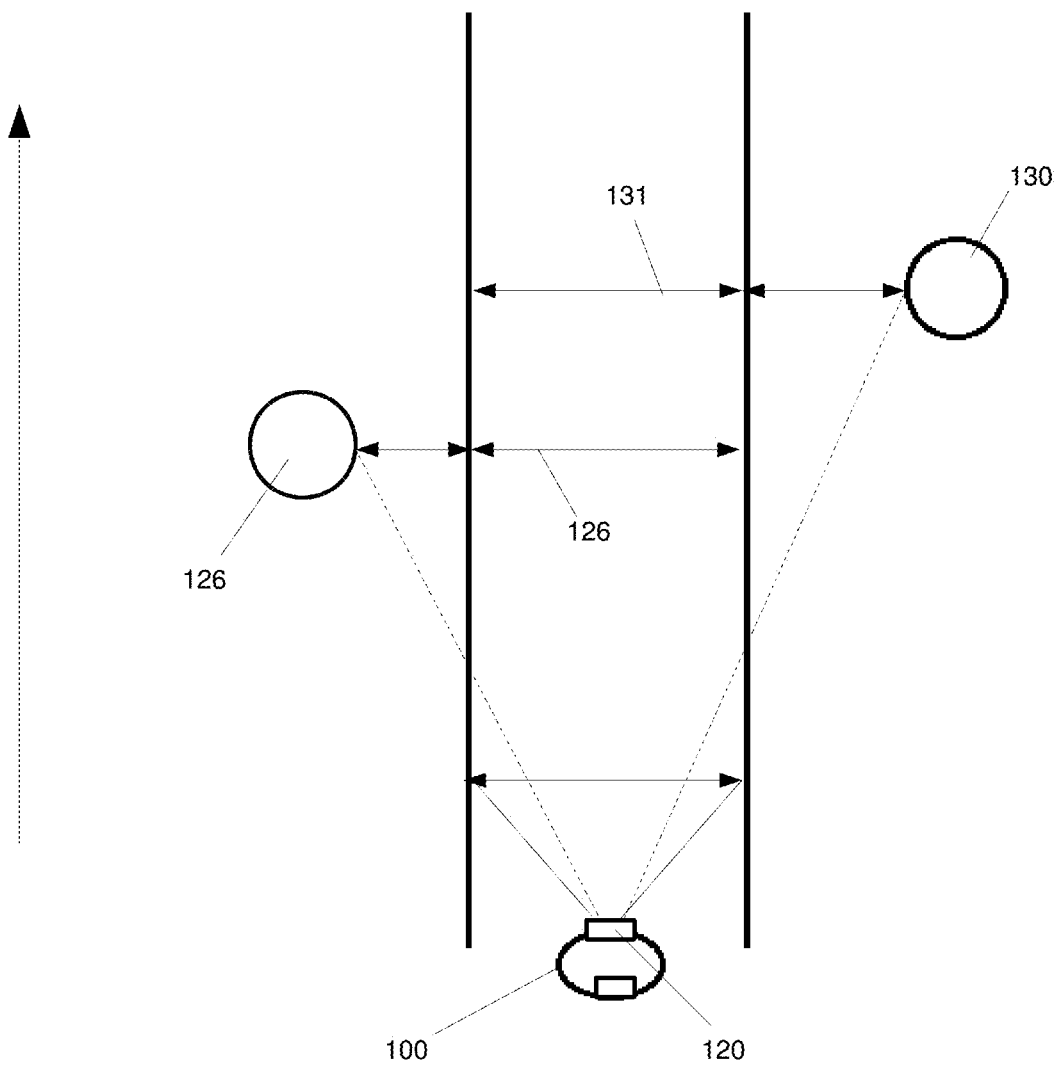
FIG. 9 is a diagrammatic view of a method of measuring distance traveled and velocity of a traveler in accordance with principles of the invention.

The environmental monitoring device 100 may also be used as an improved pedometer. Conventional pedometers are notoriously inaccurate. Pedometers are somewhat improved by incorporating a GPS module, but these are also generally not accurate enough to properly gauge distances of less than a few feet. FIG. 9 shows the environmental monitoring device 100 having a forward facing camera 120. As described above, the environmental monitoring device 100 calculates distance along a path by measuring the width of the path at a location very close to the traveler 102. By performing this calculation at a short distance, it's accuracy is greatly increased. Typically, the monitoring device 100 will calculate the width of the path within 20 feet or less, preferably within 10 feet or less and more preferably within 5 feet or less of the traveler 102. If the monitoring device 100 includes a camera having a wide angle lens, the width of the path may be determined at a closer distance.

Once the width of the path has been determined, the distance at various points along the path may be determined again by using simple trigonometry and the width of the path as measured by the image in the camera. When being used as a pedometer, a forward facing camera 120 is programmed to select one or more stationary objects, for example tree 126, close to the path. The monitor 100 then measures the change in width of the path adjacent to the tree 126 in successive camera images in order to measure changes in distance. The monitor 100 may then use this data along with the time interval between camera images to calculate the velocity of the traveler 104. The monitor 100 may perform the same calculations for additional tree 130 adjacent to a second location 131 along the path, and additional objects. Once the traveler 102 passes tree 126, the monitor may select a new object further ahead near the path and repeat the calculations. This allows the monitoring device 100 to accurately measure the speed of the traveler 102. The same method of measuring the traveler speed may be used using images from the rear facing camera. Optionally both the forward and rear facing cameras may be used to determine the traveler's velocity. If the forward and rear facing cameras determine different velocities, the two different values may be averaged.

Figure 10:
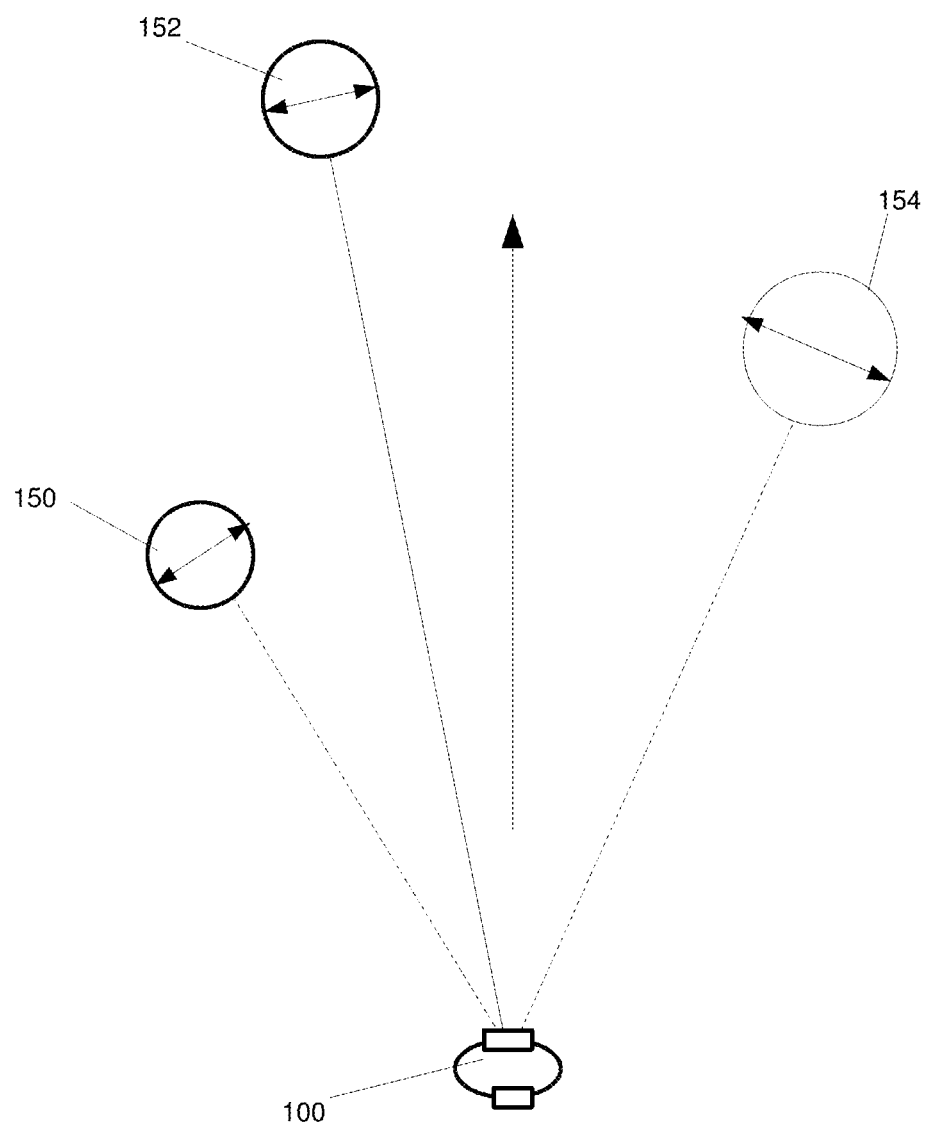
FIG. 10 is a diagrammatic view of a method of measuring the direction and distance traveled of a traveler in accordance with principles of the invention.

FIG. 10 shows a method for calculating the velocity and direction of a traveler in the absence of a clearly marked path. The monitor 100 identifies and selects three or more objects ahead of the traveler. In this embodiment, the monitor 100 has selected trees 150, 152 and 154. The monitor 100 calculates the distance to each of the trees based on the height of the monitor and the downward angle from the monitor to the base of each of the trees. The monitor 100 then compares successive camera images to measure the changes in width and position of each of the trees in the camera images. The tree whose image width increases the fastest is closest to the direction of the traveler's movements. Similarly, the tree whose image width increases the slowest is furthest from the direction of the traveler's movements. The changes over time of the distances between the traveler and the various trees may be used to calculate a velocity vector for the traveler.

The velocity can be used with other information from the traveler, such as the traveler's height, weight, age and gender to calculate the calories burned over a period of time. A map or GPS module can also be used to adjust the calories burned based upon the change in elevation over the course of a trip.

Return Path Recorder.

The monitor 100 of the invention may also be used to generate a return path for a traveler. This may be useful when a traveler is traveling through a region he or she is unfamiliar with so that the traveler can avoid getting lost. The rear facing camera records subsequent camera images until a traveler indicates that he or she is reversing course. The images recorded by the rear facing camera are placed in reverse order to provide a return path. The return path images may be displayed on the traveler's cellular phone. As the traveler back-tracks, he or she may scroll through the recorded return path images to verify that he or she is following the correct reverse path.

Optionally, the monitor 100 may compare the images of the return path to images captured by a forward facing camera as a traveler moves along the return path. The monitor also may identify and select objects within the images of the return path and use object recognition software to identify the same objects in images captured by the forward facing camera along the return trip. When two or more objects selected from images of the return path are identified in images from the forward facing camera, the microcontroller measures the differences between the images from the forward camera and the return path images and signals to the traveler a direction he or she must take in order to make the objects align in the two images being compared.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated. Those skilled in the art will appreciate that the conception, upon which this disclosure is based, may readily be utilized as a basis for the designing of other structures, methods and systems for practicing the present invention. It is important, therefore, that the claims be regarded as including such equivalent constructions insofar as they do not depart from the spirit and scope of the present invention.

The invention claimed is:

1. A method of monitoring the environment of a traveler comprising:
    providing a wearable environmental monitoring device comprising a first camera, a wireless transmitter, a storage medium containing a database of objects, and a microcontroller;
    attaching the environmental monitoring device to a traveler;
    the first camera capturing still images at preselected time intervals;
    the microcontroller running image recognition software in real-time;
    the microcontroller determining whether the one or more of the captured still images includes one or more objects in the database of objects;
    the microcontroller generating a data packet when the image recognition software identifies one or more objects from the database in one of the images captured by the first camera, the data packet including the image containing the one or more objects from the database and the time at which the image was captured;

alerting the traveler when the microcontroller determines that the captured image includes one or more objects from the database of objects;

providing a second camera capturing still images facing forward relative to the traveler as a part of the wearable environmental monitoring device, wherein the first camera faces rearward relative to the traveler;

providing the microcontroller with a height of the second camera from the ground; and, the microcontroller calculating a speed and a direction of the traveler by comparing changes in size and position of objects in subsequent images recorded by the second camera and subsequently calculating the total distance traversed by the traveler.

2. The method of monitoring the environment of a traveler of claim 1 further comprising calculating the distance and relative speed of an object identified as one or more of the preselected objects in the images recorded by the first or second cameras.

3. The method of monitoring the environment of a traveler of claim 2 further comprising:

storing a portion of the images recorded by the first camera in reverse chronological order to provide a return trip guide;

the traveler requesting the microcontroller to guide the traveler along a return trip;

the microcontroller comparing images recorded by the second camera received in real-time to the images of the return trip guide by identifying a shift in a position of at least one object in the real-time images compared to the image in the return trip guide and providing a signal to a traveler indicating a change in direction necessary for the image in the return trip guide to match the position of the image recorded by the second camera in real time.

4. The method of monitoring the environment of a traveling person of claim 3 wherein providing a signal to a traveler indicating a change in direction necessary for the image in the return trip guide to match the position of the image recorded by the second camera in real time comprises a directional arrow displayed on a cellular phone by a software application wirelessly linked to the microcontroller.

5. A method of monitoring the environment of a traveler comprising:

providing a wearable environmental monitoring device comprising a first camera, a wireless transmitter, a storage medium containing a database of objects, and a microcontroller;

attaching the environmental monitoring device to a traveler;

the first camera capturing still images at preselected time intervals;

the microcontroller running image recognition software in real-time;

the microcontroller determining whether the captured still images include one or more objects in the database of objects;

the microcontroller generating a data packet when the image recognition software identifies one or more objects from the database in one of the images captured by the first camera, the data packet including the image containing the one or more objects from the database and the time at which the image was captured;

alerting the traveler when the microcontroller determines that the captured image includes one or more objects in database of objects;

providing a remote computer having a remote database of dangerous objects;

the microcontroller transmitting the data packet to the remote computer;

the remote computer determining whether the captured image in the data packet includes one or more dangerous objects;

alerting the traveler when the remote computer determines that the captured image includes one or more dangerous objects in database of dangerous objects;

providing the microcontroller with the height of the second camera from the ground;

the microcontroller calculating the speed and direction of the traveler by comparing changes in size and position of objects in subsequent images recorded by the second camera;

calculating the distance and relative speed of an object identified as one or more of the preselected objects in the images recorded by the first or second cameras;

storing a portion of the images recorded by the first camera in reverse chronological order to provide a return trip guide;

the traveler requesting the microcontroller to guide the traveler along a return trip;

the microcontroller comparing images recorded by the second camera received in real-time to the images of the return trip guide by identifying a shift in a position of at least one object in the real-time images compared to the image in the return trip guide and providing a signal to a traveler indicating a change in direction necessary for the image in the return trip guide to match the position of the image recorded by the second camera in real time.

* * * * *